United States Patent
Wu (10) Patent No.: US 6,684,563 B2
(45) Date of Patent: Feb. 3, 2004

(54) WATERING DEVICE

(76) Inventor: Yu-Jui Wu, 3rd Fl., No. 437, Niou Pu Rd., Hsin Chu City (TW)

( * ) Notice: Subject to any disclaimer, the term of this patent is extended or adjusted under 35 U.S.C. 154(b) by 0 days.

(21) Appl. No.: 10/259,083

(22) Filed: Sep. 26, 2002

(65) Prior Publication Data

US 2003/0079402 A1 May 1, 2003

(30) Foreign Application Priority Data

Nov. 1, 2001 (TW) ...................................... 90218894 U (51) Int. Cl.$^7$ .............................................. A01G 29/00
(52) U.S. Cl. ................................................. 47/48.5
(58) Field of Search ........................... 47/48.5, 79, 40.5

(56) References Cited

U.S. PATENT DOCUMENTS

| | | | | |
|---|---|---|---|---|
| 3,357,129 A | * | 12/1967 | Torrence | 47/79 |
| 4,578,897 A | * | 4/1986 | Pazar et al. | 47/48.5 |
| 4,934,287 A | * | 6/1990 | Guin et al. | 111/7.1 |
| 4,970,823 A | * | 11/1990 | Chen et al. | 47/48.5 |
| 5,113,888 A | * | 5/1992 | Beggs | 137/1 |
| 5,172,515 A | * | 12/1992 | Lapshansky et al. | 47/48.5 |
| 5,813,605 A | * | 9/1998 | Chou | 239/64 |
| 5,836,106 A | * | 11/1998 | Alex | 47/48.5 |
| 5,896,700 A | * | 4/1999 | McGough | 47/48.5 |
| 6,052,942 A | * | 4/2000 | Chu | 47/48.5 |
| 6,128,856 A | * | 10/2000 | Doan | 47/48.5 |
| 6,219,963 B1 | * | 4/2001 | Wang | 47/48.5 |
| 6,220,525 B1 | * | 4/2001 | McSherdon | 239/271 |
| 6,243,986 B1 | * | 6/2001 | Crowley | 47/48.5 |
| 6,283,385 B1 | * | 9/2001 | Beaver et al. | 239/10 |

* cited by examiner

Primary Examiner—Son T Nguyen
(74) Attorney, Agent, or Firm—W. Wayne Liauh (57) ABSTRACT

A watering device comprises a watering container, a cap, a control knob, and an air tube. The cap is fastened with the water container such that an air inlet of the cap and a channel of a tapered projection of the cap are in communication with the hollow interior of the water container. The tapered projection of the cap is provided with at least one water discharging hole in communication with the air inlet of the cap. The control knob is rotatably fastened with an outer end of the air inlet such that the control knob can be turned to block the air inlet. The air tube is fastened at one end with an inner end of the air inlet such that other end of the air tube is extended into the hollow interior of the water container.

4 Claims, 9 Drawing Sheets

WATERING DEVICE

FIELD OF THE INVENTION

The present invention relates generally to a gardening implement, and more particularly to a watering device.

BACKGROUND OF THE INVENTION

Figure 1:
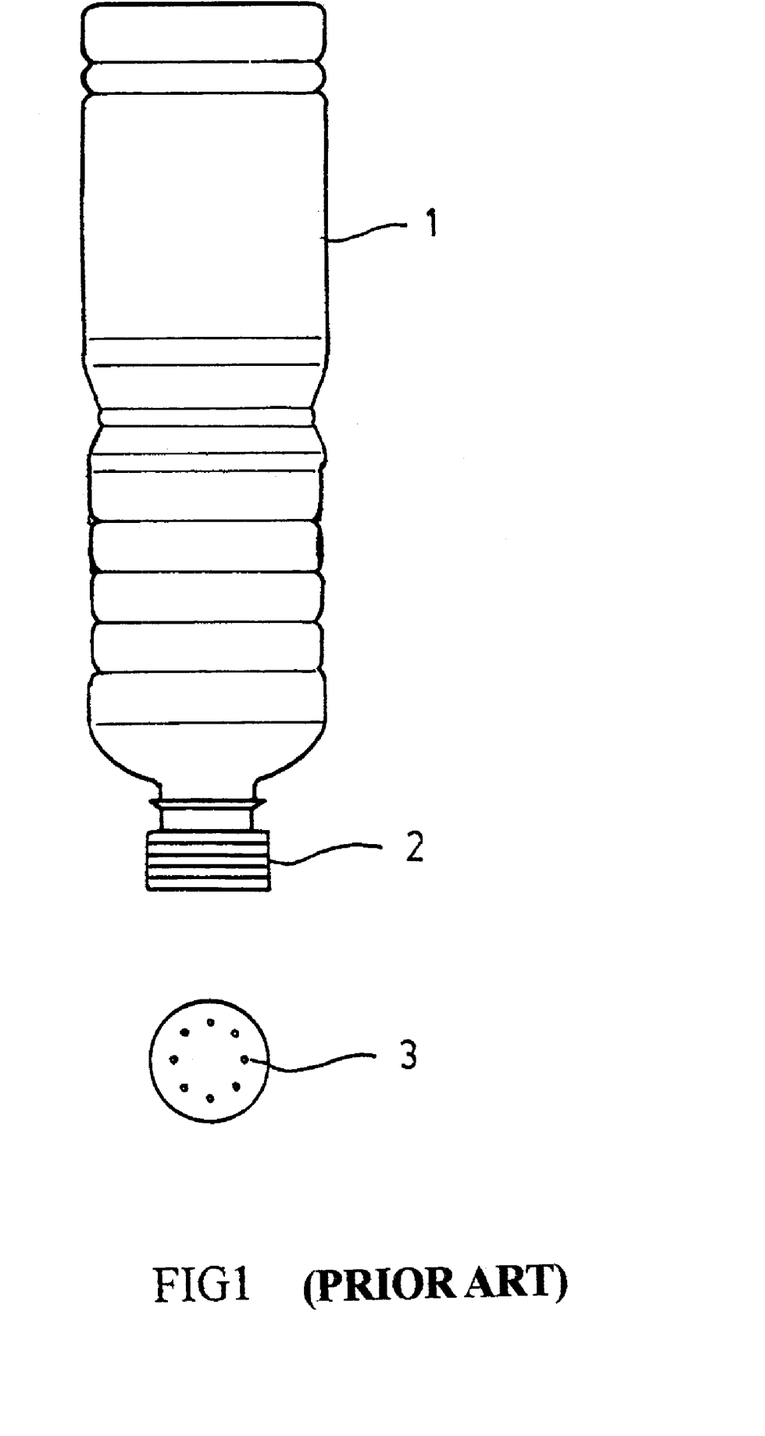
FIG. 1 shows a schematic plan view of a watering device of the prior art.
Figure 2:
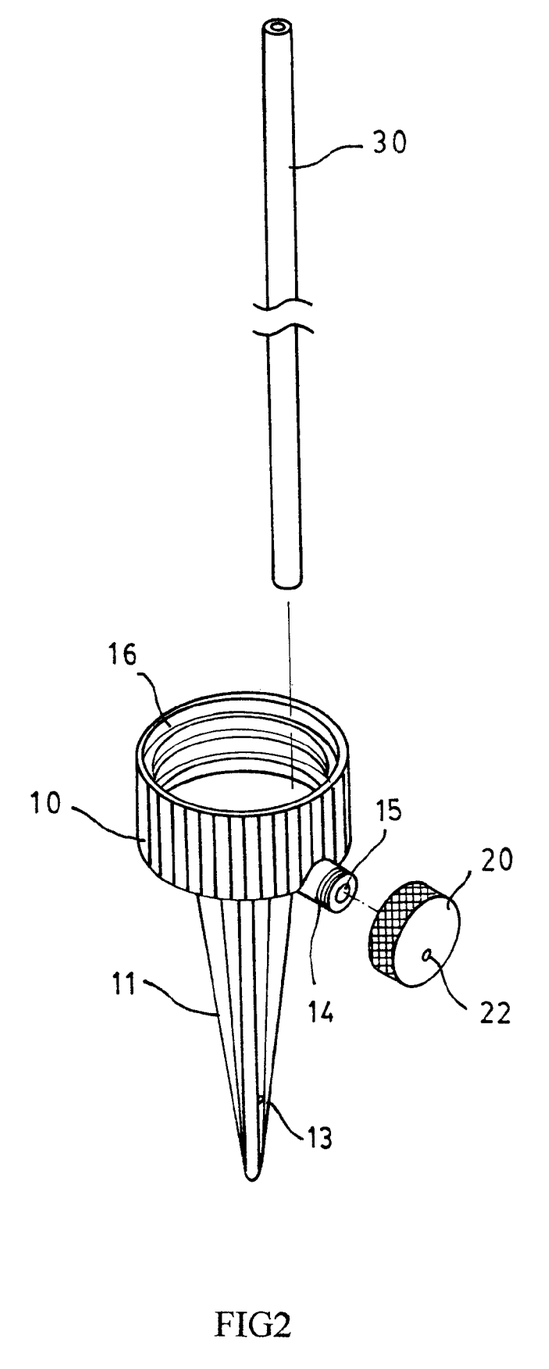
FIG. 2 shows an exploded view of the present invention.
Figure 3:
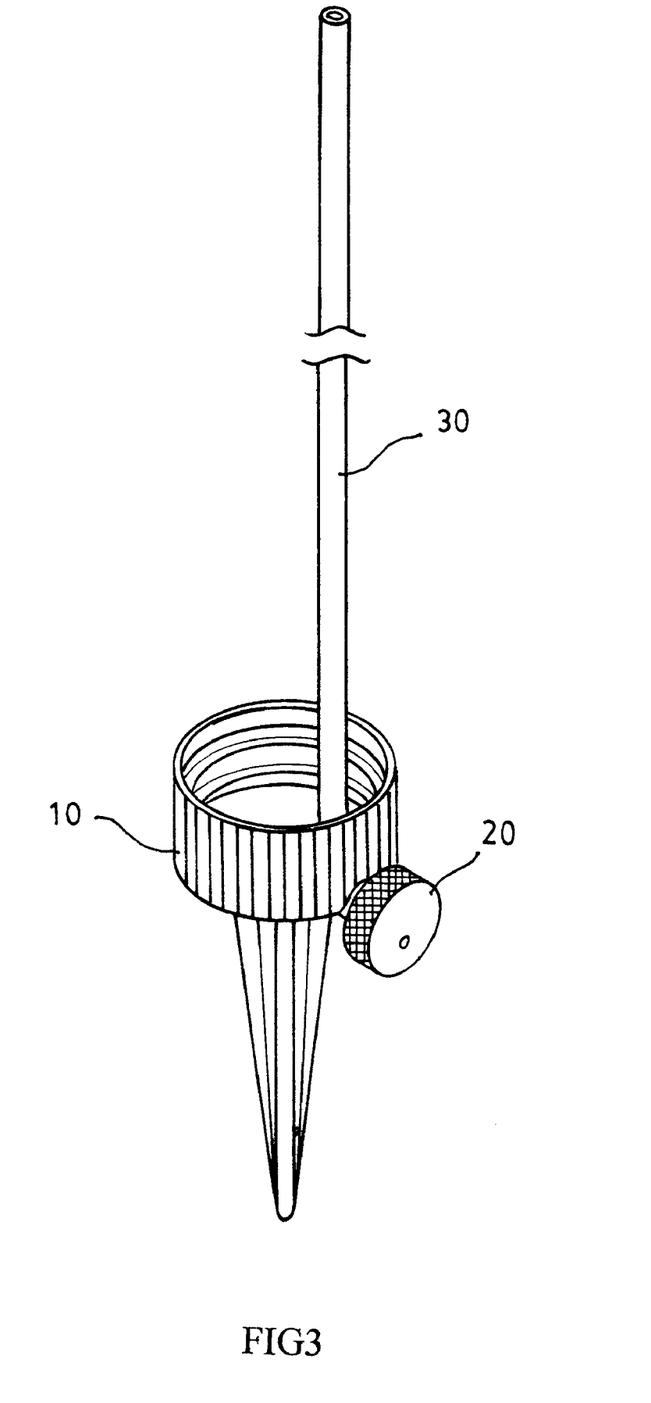
FIG. 3 shows a perspective view of the present invention.
Figure 4:
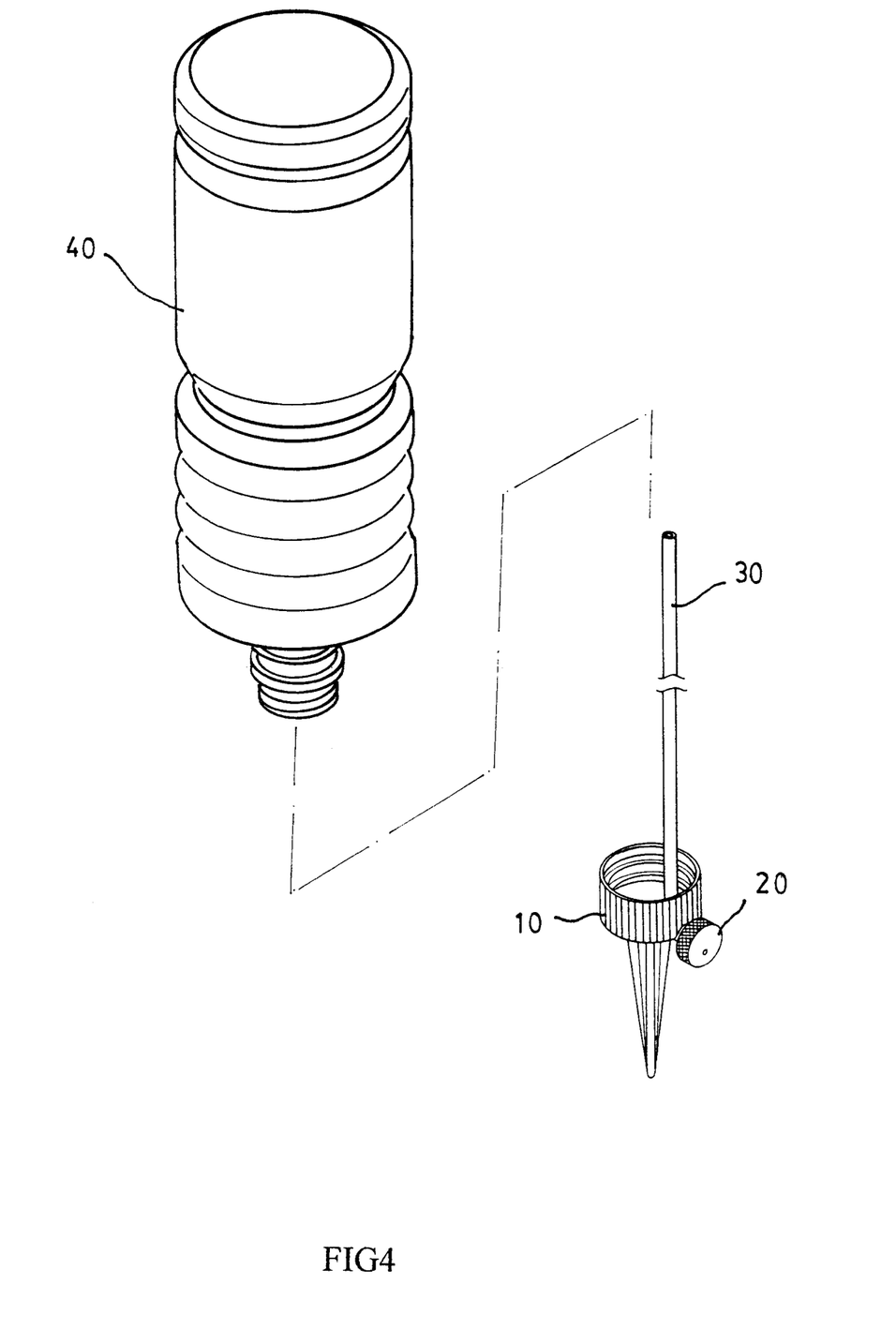
FIG. 4 shows a schematic view of the present invention and a discarded container of poly ethylene terethtarate.

As shown in FIG. 1, a watering device of the prior art comprises a water container 1, and a perforated cap 2 having a number of through holes 3. The prior art watering device is designed to water the indoor plants; nevertheless it is not provided with means to supply the indoor plants with a predetermind amount of water at a predetermined interval. As a result, the prior art watering device is of a little use to a person who is often away from home for a prolonged period of time.

SUMMARY OF THE INVENTION

It is the primary objective of the present invention to provide a watering device capable of automatic control of the supply amount of water.

It is another objective of the present invention to provide a watering device with means to give water automatically to the soil in which the houseplants grow.

It is still another objective of the present invention to provide a watering device which makes use of a discarded container of poly ethylene terethtarate (PET), so as to recycle the discarded container.

The features and the advantages of the present invention will be readily understood upon a thoughtful deliberation of the following detailed description of the present invention with reference to the accompanying drawings.

DETAILED DESCRIPTION OF THE INVENTION

As shown in FIGS. 2–7, a watering device of the present invention comprises a cap 10, a control knob 20, an air tube 30, and a water container 40.

The cap 10 has inner threads 16, an open end, and a closed end which is provided in the outer wall with a tapered projection 11. The tapered projection 11 is provided in the interior with a channel 12 extending along the longitudinal direction of the tapered projection 11. The tapered projection 11 is further provided in one side of the free end thereof with a water discharging hole 13 in communication with the channel 12. The cap 10 is further provided with an air inlet 14 which is in turn provided with outer threads and an air duct 15 in communication with the hollow interior of the cap 10.

The control knob 20 is provided in one end with an inner threaded hole and a control block 21 of a tapered construction. The control knob 20 is further provided with a ventilation hole 22 in communication with the hollow interior of the control knob 20.

The air tube 30 is of a hollow tubular construction and a predetermined length.

In combination, the control knob 20 is fastened with the air inlet 14 such that the inner threaded hole of the control knob 20 is engaged with the outer threads of the air inlet 14, and that the, control block 21 of the control knob 20 is fitted into one end of the air duct 15 of the air inlet 14. The air tube 30 is fitted at one end over other end of the air duct 15. The cap 10 is fastened with the water container 40 such that the inner threads 16 of the cap 10 are engaged with outer threads of the neck of the water container 40.

Figure 5:
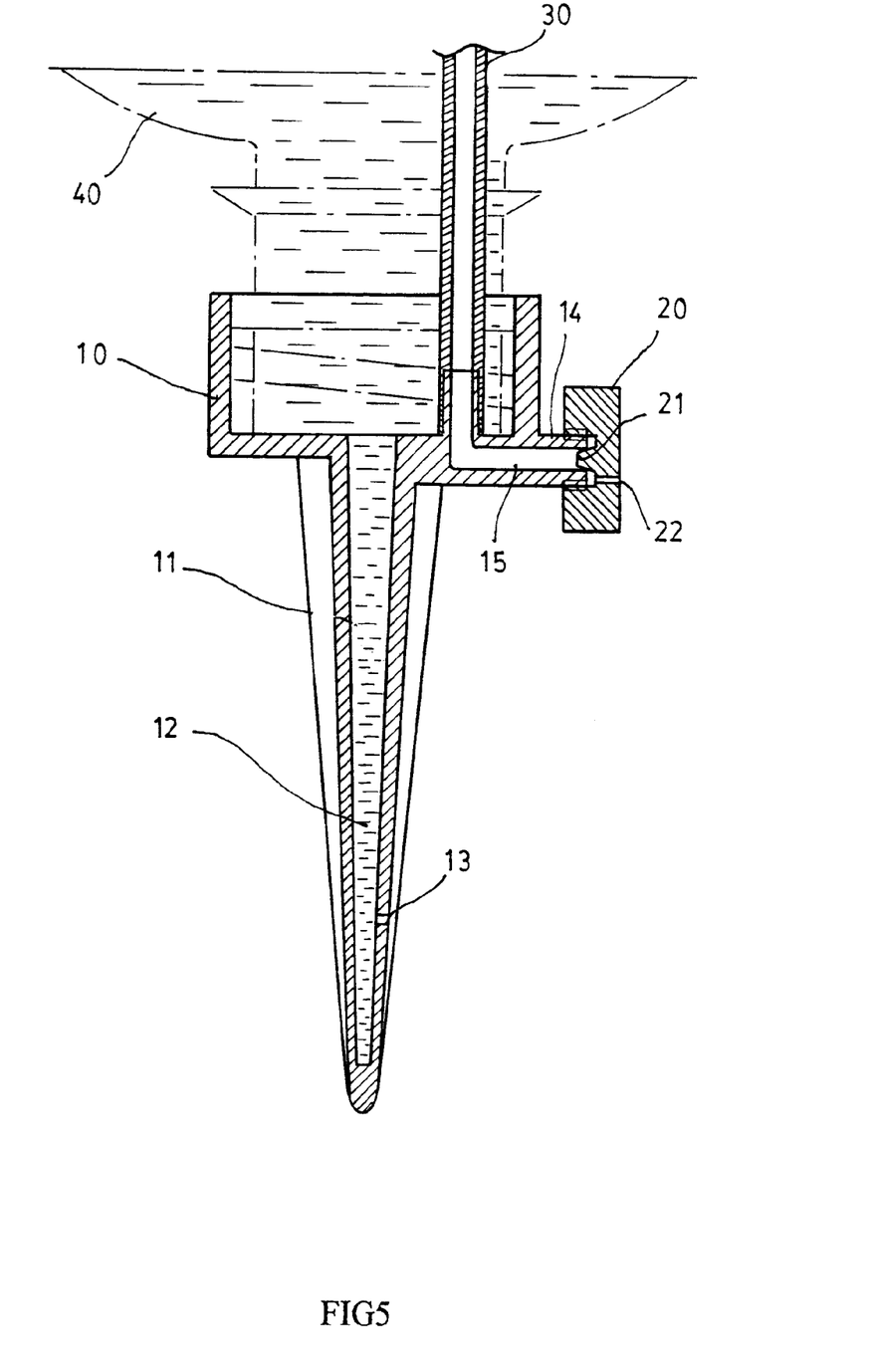
FIG. 5 shows a longitudinal sectional view of the present invention.
Figure 6:
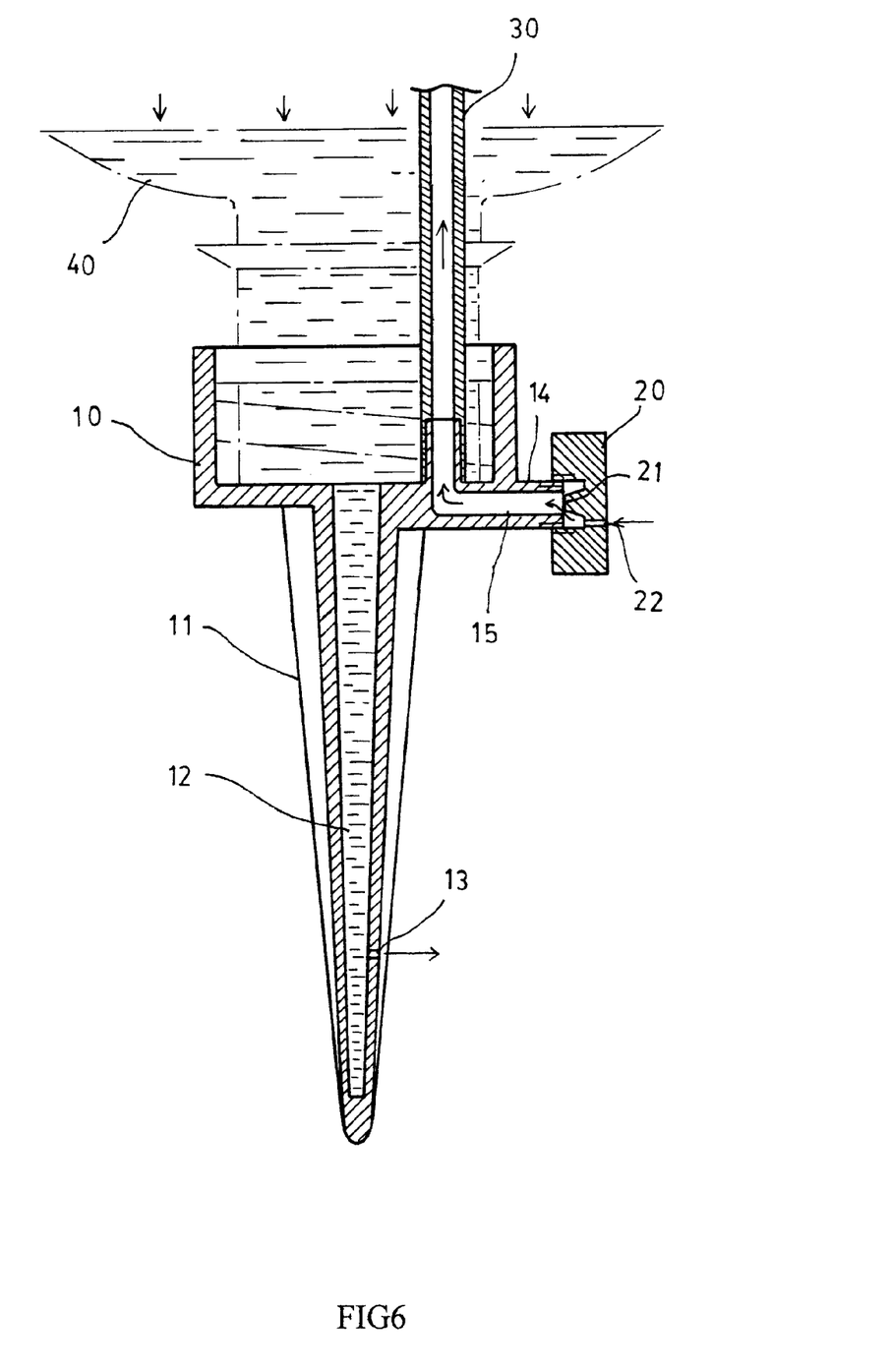
FIG. 6 shows a longitudinal sectional view of the present invention in action.
Figure 7:
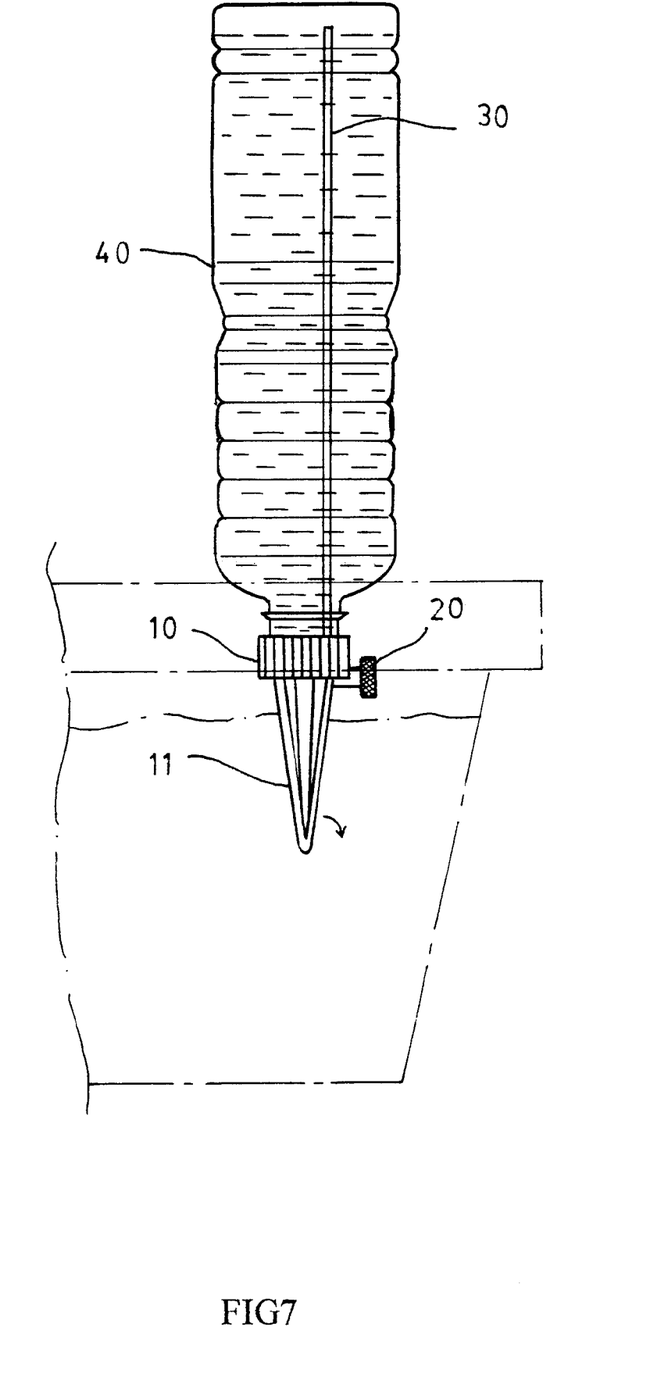
FIG. 7 shows a schematic view of the present invention at work.

The water container 40 contains a predetermined amount of water. In use the water container 40 is placed upside down such that other end of the air tube 30 islocated above the water level, as shown in FIG. 7, and that the tapered projection 11 of the cap 10 is inserted into the soil held in a pot, in which an indoor plant is grown. As long as the air duct 15 of the air inlet 14 is blocked by the control block 21 of the control knob 20, the atmospheric air is prevented from getting into the air tube 30, as shown in FIG. 5. As a result, the water contained in the water container 40 is not let out into the pot soil. When the control knob 20 is so turned that the control block 21 of the control knob 20 no longer blocks the one end of the air duct 15 of the air inlet 14, thereby resulting in entry of the atmospheric air into the air tube 30 via the ventilation hole 22 of the control knob 20 and the air duct 15 of the air inlet 14, as shown by arrows in FIG. 6. In light of present of the atmospheric air exerting on the water level of the water container 40, the water is forced out into the pot soil via the channel 12 and the water discharging hole 13 of the tapered projection 11 of the cap 10, as shown in FIGS. 6 and 7.

Figure 8:
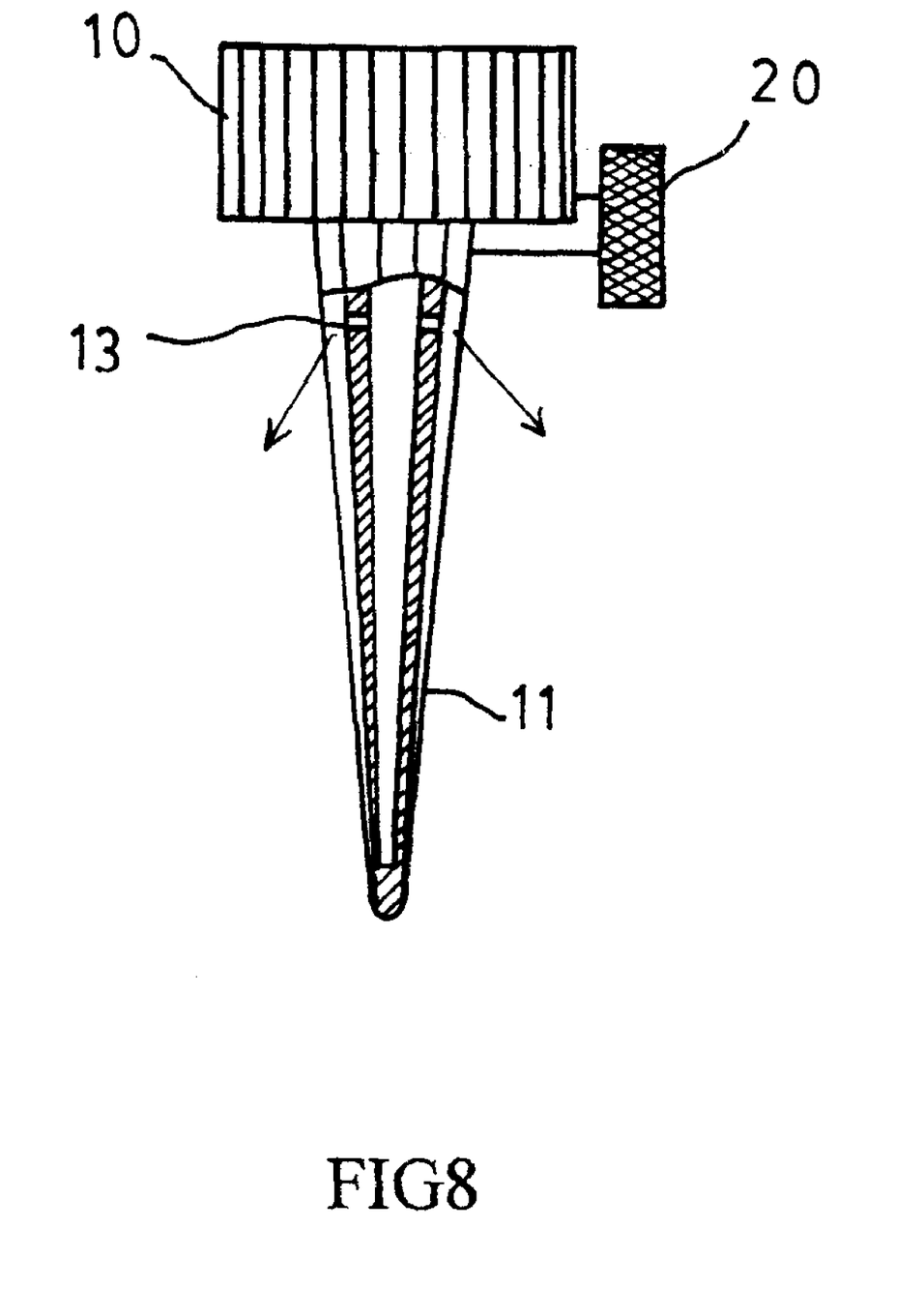
FIG. 8 shows a sectional view of a second preferred embodiment of the present invention.

As shown in FIG. 8, the tapered projection 11 of the cap 10 is provided with a plurality of water discharging holes 13 in communication with the channel 12, thereby supplying the pot soil with water in various directions.

Figure 9:
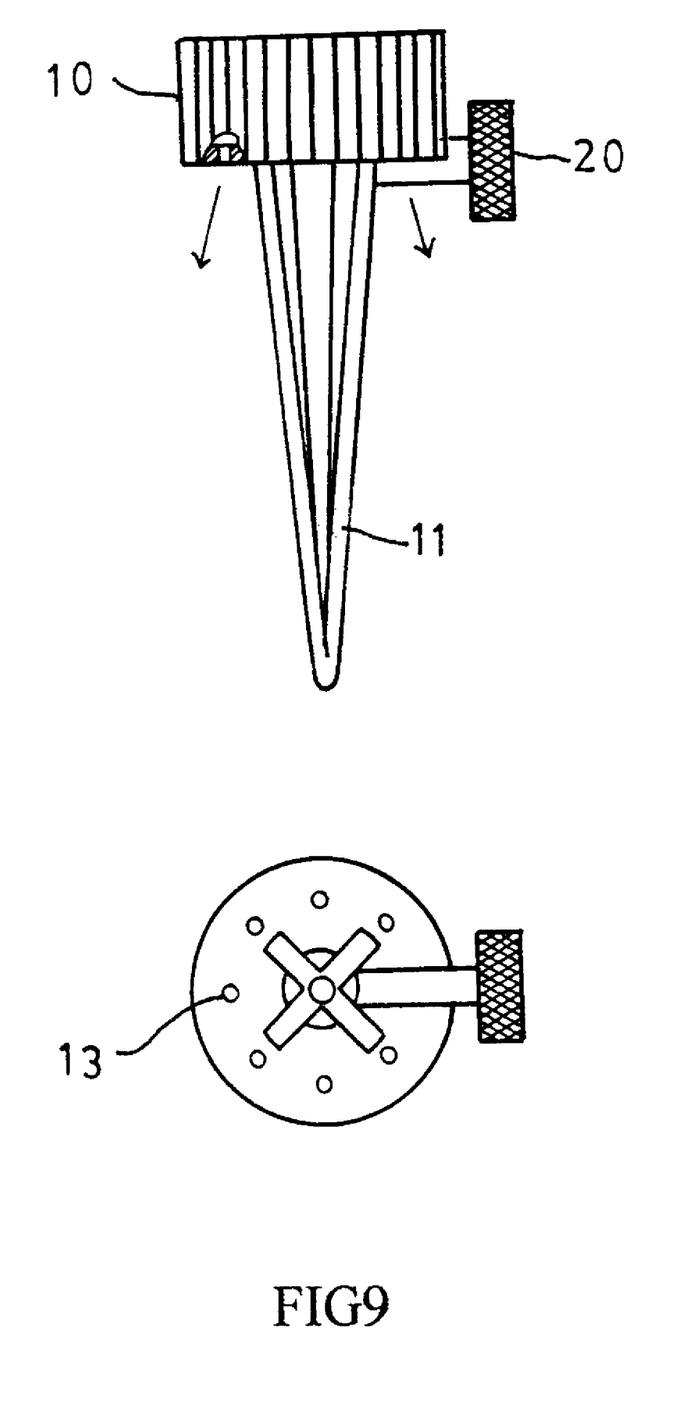
FIG. 9 shows a sectional view of a third preferred embodiment of the present invention.

As shown in FIG. 9, a plurality of water discharging holes 13 are located in the closed end of the cap 10 instead of the tapered projection 11.

The water container 40 is a discarded container made of poly ethylene terethtarate(PET).

The present invention described is to be regarded in all respects as being illustrative and nonrestrictive. Accordingly, the present invention may be embodied in other specific forms without deviating from the spirit thereof. The present invention is therefore to be limited only by the scopes of the following claims.

What is claimed is:

1. A water device comprising:
   a water container;
   a cap provided with an air inlet, and a tapered projection extending from a closed end of said cap and having a longitudinally-oriented channel and a water discharging hole in communication with said channel wherein said cap is fastened at an open end with said water container such that said channel and air inlet are in communication with a hollow interior of said water container, and said air inlet is formed through a side of said cap and is generally perpendicular to said channel;

a hollow air tube of a length such that said air tube is fastened at one end thereof to an inner end of said air inlet and that another end of said air tube is located inside the hollow interior of said water container; and a control knob provided in a closed end with an air ventilation, and in an open end with a control block whereby wherein said control knob is rotatably engaged with an outer end of said air inlet of said cap such that the outer end of said air inlet is blocked by said control block of said control knob, and that said control knob is turned to unblock said air inlet so as to enable said air ventilation hole of said control knob to be in communication with said air inlet.

2. The watering device as defined in claim 1, wherein said tapered projection of said cap is provided with a plurality of water discharging holes in communication with said channel of said tapered projection.

3. The watering device as defined in claim 1, wherein said water container is a container made of poly ethylene terethtarate.

4. A water device comprising:

a water container:

a cap provided with an air inlet, and a tapered projection extending from a closed end of said cap and having a longitudinally-oriented channel, wherein said cap is fastened at an open end with said water container such that said channel and air inlet are in communication with a hollow interior of said water container, and said air inlet is formed through a side of said cap and is generally perpendicular to said channel;

a hollow air tube of a length such that said air tube is fastened at one end thereof to an inner end of said air inlet and that another end of said air tube is located inside the hollow interior of said water container; and a control knob provided in a closed end with an air ventilation, and in an open end with a control block wherein said control knob is rotatably engaged with an outer end of said air inlet of said cap such that the outer end of said air inlet is blocked by said control block of said control knob, and that said control knob is turned to unblock said air inlet so as to enable said air ventilation hole of said control knob to be in communication with said air inlet;

wherein said cap is provided in the closed end with a plurality of water discharging holes in communication with the hollow interior of said water container.

* * * * *